(12) United States Patent
Wang et al.

(10) Patent No.: US 9,243,569 B2
(45) Date of Patent: Jan. 26, 2016

(54) VARIABLE CAM TIMING CONTROL DURING ENGINE SHUT-DOWN AND START-UP

(75) Inventors: Yan Wang, Ann Arbor, MI (US); James Douglas Ervin, Novi, MI (US); Kim Hwe Ku, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 955 days.

(21) Appl. No.: 13/439,742

(22) Filed: Apr. 4, 2012

(65) Prior Publication Data

US 2013/0268179 A1  Oct. 10, 2013

(51) Int. Cl.
*F02D 13/08* (2006.01)

(52) U.S. Cl.
CPC . *F02D 13/08* (2013.01); *Y02T 10/18* (2013.01)

(58) Field of Classification Search
CPC ......... F01L 1/34; F01L 1/352; F01L 2800/03; F01L 2001/3522; F01L 2013/103; F01L 2820/032; Y02T 10/18; F02D 13/0203; F02D 13/0219; F02D 13/08; F02D 41/042; F02D 41/062; F02N 19/004
USPC ............ 123/90.11, 90.15–90.18, 90.2, 90.27, 123/90.31, 345–348; 701/105, 107, 112, 701/113; 464/1, 2, 160
See application file for complete search history.

(56) References Cited

U.S. PATENT DOCUMENTS

| | | | | |
|---|---|---|---|---|
| 6,477,993 | B1* | 11/2002 | Katsumata et al. | 123/90.11 |
| 6,637,391 | B2* | 10/2003 | Muraki et al. | 123/90.17 |
| 7,159,545 | B2 | 1/2007 | Miyakoshi et al. | |
| 7,252,055 | B2 | 8/2007 | Tani et al. | |
| 7,958,858 | B2 | 6/2011 | Ichimoto et al. | |
| 8,091,523 | B2* | 1/2012 | Mikawa et al. | 123/90.17 |
| 2002/0010540 | A1* | 1/2002 | Moriya et al. | 701/115 |
| 2002/0014215 | A1* | 2/2002 | Ishii et al. | 123/90.17 |
| 2002/0134334 | A1* | 9/2002 | Yamada et al. | 123/90.17 |
| 2003/0121486 | A1* | 7/2003 | Komazawa et al. | 123/90.17 |
| 2005/0235938 | A1* | 10/2005 | Tani et al. | 123/90.17 |
| 2007/0163531 | A1* | 7/2007 | Lewis et al. | 123/179.4 |
| 2008/0216779 | A1* | 9/2008 | Watanabe et al. | 123/90.15 |
| 2010/0000478 | A1* | 1/2010 | Yoshikawa et al. | 123/90.15 |
| 2011/0231077 | A1* | 9/2011 | Nakamura | 701/102 |
| 2012/0174883 | A1* | 7/2012 | Kokubo et al. | 123/90.15 |
| 2013/0080027 | A1* | 3/2013 | Mikawa | 701/102 |

* cited by examiner

*Primary Examiner* — Erick Solis
*Assistant Examiner* — Carl Staubach
(74) *Attorney, Agent, or Firm* — Julia Voutyras; Alleman Hall McCoy Russell & Tuttle LLP

(57) ABSTRACT

A method for controlling an electric variable cam timing (VCT) actuator is disclosed. The method includes during engine shutdown, adjusting camshaft position with an electric VCT actuator to a target starting location, applying a first current to the electric VCT actuator to maintain the target starting location, and during engine startup before camshaft position feedback becomes available, applying a second current to the electric VCT actuator to maintain the target starting location.

17 Claims, 5 Drawing Sheets

VARIABLE CAM TIMING CONTROL DURING ENGINE SHUT-DOWN AND START-UP

BACKGROUND AND SUMMARY

Variable cam timing (VCT) systems may be implemented in an engine to adjust a camshaft position that results in the camshaft timing being advanced or retarded. By controlling the cam timing with the VCT system, intake/exhaust valve timing may be varied based on engine operating conditions, such as engine load and engine speed. Such variable control facilitates increased engine performance, reduced emissions, and increased fuel efficiency compared to engines with fixed camshafts.

More particularly, electric VCT systems provide camshaft positioning functionality while the engine is cranking and firing events are not occurring. In other words, an electric VCT system can move a camshaft to a desired position for a first firing event during engine start-up. In one example, the electric VCT system adjusts the camshaft position based on closed-loop feedback that is calculated based on crankshaft position and camshaft profile ignition pickup (PIP) signals. These signals may be unavailable and/or unreliable until the engine speed meets a minimum threshold. Correspondingly, the closed-loop control of the camshaft is not available until the engine speed meets a minimum threshold. One way to avoid this issue is to move the camshaft to the desired position for the first firing event before engine shut-down. This way, the camshaft can be located at the desired position when the engine starts.

However, the inventors herein have recognized potential issues with such an approach. For example, the VCT system may not include locking pins to keep the camshaft in the desired position when there is no power to the VCT system. In such cases, closed loop feedback is not available when the engine speed drops below a certain threshold during engine shut-down and before the engine speed is above another threshold during engine start-up. Therefore, the position of the camshaft may be moved to a retarded position due to friction drag effects during the un-controlled phases, and thus would not be maintained at the desired location for the first engine firing event.

Thus, in one example, some of the above issues may be addressed by a method for controlling an electric VCT actuator. The method includes, during engine shutdown, adjusting a camshaft with an electric VCT actuator to a target starting location, applying a first current to the electric VCT actuator to maintain the target starting location, and during engine startup before camshaft feedback becomes available, applying a second current to the electric VCT actuator to maintain the target starting location. The first current may be a fixed current level irrespective of conditions, or it may be adjusted to various different levels depending on the conditions. Similarly, the second current may also be a fixed current level irrespective of conditions, or it may be adjusted to various different levels depending on the conditions, but it is nevertheless different than the first current for a given engine start procedure.

In one example, by providing the designated currents to the VCT actuator when the camshaft measurement is unavailable during engine shutdown and startup, the camshaft may be substantially prevented from drifting from the target starting position. In some embodiments, the current applied to the VCT actuator may differ between engine shutdown and engine startup because the valvetrain torque that is applied to the camshaft during engine shutdown and engine startup may differ. Further, when the camshaft position feedback becomes available, the accuracy of the camshaft position relative to the target starting position can be confirmed. In the event that the camshaft position is not at the target starting position, the electric VCT actuator can be controlled to quickly adjust the camshaft position to the target starting position since the camshaft is likely to be close to the target starting position. Thus, the time for the camshaft to achieve the target starting position after regaining feedback control may be substantially reduced, or in the ideal case reduced to zero, relative to an electric VCT system that does not provide different current levels for different conditions when the camshaft position feedback is unavailable.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

Methods and systems are provided for adjusting a position of a camshaft of an engine (such as the engine shown in FIG. 1) with an electric variable cam timing (VCT) system. More particularly, the camshaft position may be adjusted to a target starting position during engine shutdown in preparation for a first firing event of a following engine startup. Further, the camshaft may be maintained at the target starting position, for example, within a range of degrees of the desired timing (such as 5 degrees or less) when camshaft position feedback is unavailable during engine shutdown and the following engine startup. For example, the camshaft may be maintained at the target starting position when camshaft feedback is unavailable by applying a pre-set current to an electric VCT actuator (such as the electric VCT actuators shown in FIG. 2) to compensate for valvetrain torque that is applied to the camshaft during engine shutdown and engine startup. A controller may be configured to perform a control routine, such as the example routine of FIG. 3, to maintain a camshaft position at a target starting position when camshaft position feedback is unavailable during engine shutdown and startup. The camshaft position may be maintained at the target starting position by applying pre-set currents (such as the currents shown in FIG. 4) to the electric VCT actuator. In this way, the camshaft may be prevented from drifting from the target starting position when camshaft position feedback is unavailable during engine shutdown and engine startup.

Figure 1:
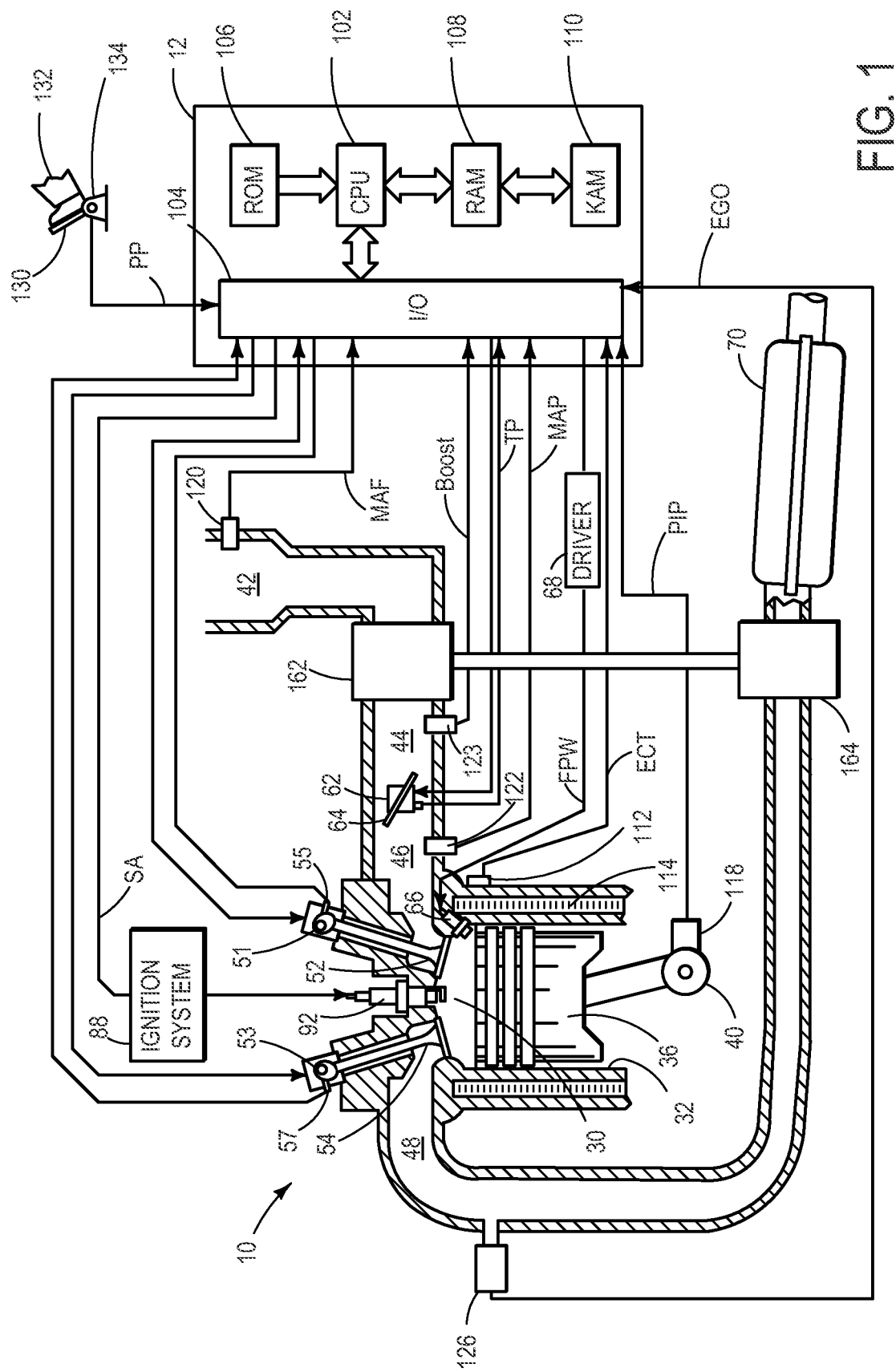
FIG. 1 shows an embodiment of an engine system according to the present description.

FIG. 1 is a schematic diagram showing one cylinder of multi-cylinder engine 10, which may be included in a propulsion system of an automobile. Engine 10 may be controlled at least partially by a control system including controller 12 and by input from a vehicle operator 132 via an input device 130.

In this example, input device 130 includes an accelerator pedal and a pedal position sensor 134 for generating a proportional pedal position signal PP. Combustion chamber (a.k.a., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 46 via intake passage 42 and may exhaust combustion gases via exhaust passage 48. Intake manifold 46 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The cam actuation system used to vary valve operation is further elaborated at FIG. 2. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake manifold 46 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold absolute pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Engine 10 may further include a compression device such as a turbocharger or supercharger including at least a compressor 162 arranged along compressor passage 44, which may include a boost sensor 123 for measuring air pressure. For a turbocharger, compressor 162 may be at least partially driven by a turbine 164 (e.g. via a shaft) arranged along exhaust passage 48. For a supercharger, compressor 162 may be at least partially driven by the engine and/or an electric machine, and may not include a turbine. Thus, the amount of compression provided to one or more cylinders of the engine via a turbocharger or supercharger may be varied by controller 12.

Further, in the disclosed embodiments, an exhaust gas recirculation (EGR) system (not shown) may route a desired portion of exhaust gas from exhaust passage 48 to boost passage 44 and/or intake passage 42 via an EGR passage. The amount of EGR provided to boost passage 44 and/or intake passage 42 may be varied by controller 12 via an EGR valve. Further, an EGR sensor may be arranged within the EGR passage and may provide an indication of one or more pressure, temperature, and concentration of the exhaust gas.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Storage medium read-only memory 106 can be programmed with computer readable data representing instructions executable by processor 102 for performing the methods described below as well as other variants that are anticipated but not specifically listed.

Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and manifold absolute pressure signal (MAP) from sensor 122. Engine speed signal (RPM) may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During some conditions, the MAP sensor can give an indication of engine torque. Further, this sensor, along with the detected engine speed and other signals, can provide an estimate of charge (including air) inducted into the cylinder. In one example, sensor 118, which is also used as an engine speed sensor, may produce a predetermined number of equally spaced pulses every revolution of the crankshaft.

As described above, FIG. 1 shows only one cylinder of a multi-cylinder engine, and each cylinder may similarly include its own set of intake/exhaust valves, fuel injector, spark plug, etc. However, some or all of the cylinders may share some components such as camshafts for controlling valve operation. In this manner, a common camshaft may be used to control valve operation for two or more cylinders.

Figure 2:
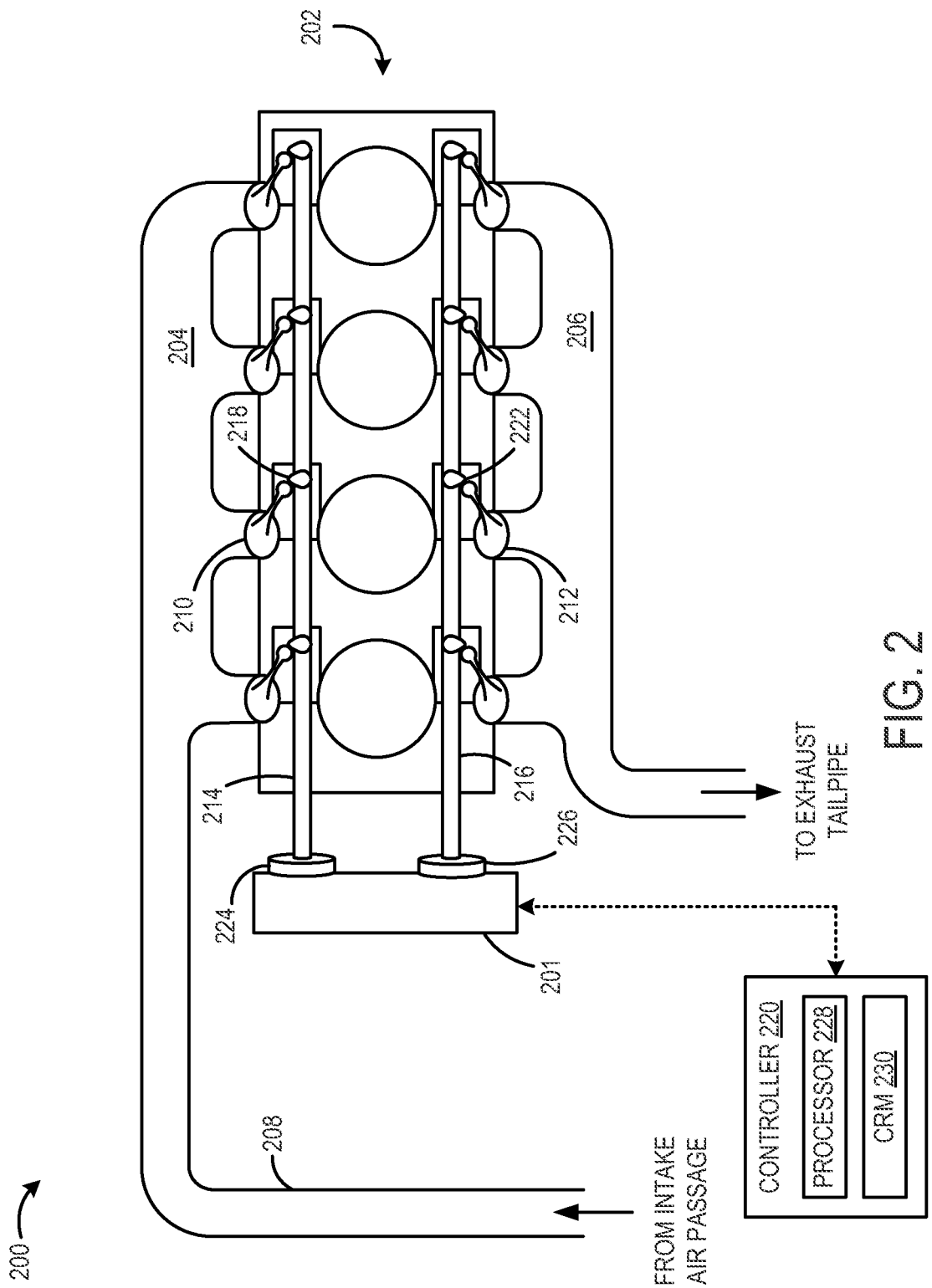
FIG. 2 shows an embodiment of an electric variable cam timing (VCT) system according to the present description.

FIG. 2 shows an example embodiment of an engine 200 including an electric VCT system 201 that is configured adjust a camshaft position of one or more camshafts of the engine. Engine 200 is shown having an intake manifold 204 configured to supply intake air and/or fuel to a plurality of cylinders 202 and an exhaust manifold 206 configured to exhaust the combustion products from the plurality of cylinders. Ambient air flow can enter the intake system through intake air passage 208. The flow rate of intake air can to the intake manifold 204 can be controlled at least in part by a main throttle (not shown) positioned in the intake air passage 208. The plurality of cylinders 202 each may be serviced by one or more valves. In the present example, each cylinder includes a corresponding intake valve 210 and an exhaust valve 212. As elaborated below, engine 200 includes one or more camshafts 214 and 216 that each can be actuated to operate intake and/or exhaust valves of a plurality of cylinders that are coupled to a common camshaft.

Each intake valve 210 is actuatable between an open position that allows intake air into the corresponding cylinder and a closed position substantially blocking intake air from the cylinder. The intake valves 210 of the plurality of cylinders 202 may be actuated by a common intake camshaft 214. Intake camshaft 214 includes intake cams 218 that have a cam lobe profile for opening the intake valves 210 for a defined intake duration. In some embodiments (not shown), the camshaft may include additional intake cams with an alternate cam lobe profile that allows the intake valves 210 to be opened for an alternate duration (herein also referred to as a cam profile switching system). Based on the lobe profile of the additional cam, the alternate duration may be longer or shorter than the defined intake duration of intake cam 218. The lobe profile may affect cam lift height, cam duration, and/or cam timing. A controller 220 may be able to switch the intake valve duration by moving the intake camshaft 214 longitudinally and switching between cam profiles. In one example, controller 220 is the same as controller 12 of FIG. 1)

In the same manner, each exhaust valve 212 is actuatable between an open position allowing exhaust gas out of the corresponding cylinder and a closed position substantially retaining gas within the cylinder. The exhaust valves 212 of the plurality of cylinders 202 may be actuated by a common exhaust camshaft 216. Exhaust camshaft 2196 includes exhaust cams 222 that have a cam lobe profile for opening the exhaust valves 212 for a defined exhaust duration. In some embodiments (not shown), the camshaft may include additional exhaust cams with an alternate cam lobe profile that allows the exhaust valves 212 to be opened for an alternate duration. Based on the lobe profile of the additional cam, the alternate duration may be longer or shorter than the defined exhaust duration of exhaust cam 222. The lobe profile may affect cam lift height, cam duration, and/or cam timing. Controller 220 may be able to switch the exhaust valve duration by moving the exhaust camshaft 216 longitudinally and switching between cam profiles.

It will be appreciated that while the depicted example shows common intake camshaft 214 coupled to the intake valves 210 of each cylinder, and common exhaust camshaft 216 coupled to the exhaust valves 212 of each cylinder, in alternate embodiments, the camshafts may be coupled to cylinder subsets, and multiple intake and/or exhaust camshafts may be present. For example, a first intake camshaft may be coupled to the intake valves of a first subset of cylinders while a second intake camshaft may be coupled to the intake valves of a second subset of cylinders. Likewise, a first exhaust camshaft may be coupled to the exhaust valves of a first subset of cylinders while a second exhaust camshaft may be coupled to the exhaust valves of a second subset of cylinders. Further still, one or more intake valves and exhaust valves may be coupled to each camshaft. The subset of cylinders coupled to the camshaft may be based on their position along the engine block, their firing order, the engine configuration, etc.

In some embodiments, the camshafts and associated components may further interact with push rods, rocker arms, tappets, etc to actuate the intake/exhaust valves. Such devices and features may control actuation of the intake valves 210 and the exhaust valves 212 by converting rotational motion of the cams into translational motion of the valves. As previously discussed, the valves can also be actuated via additional cam lobe profiles on the camshafts, where the cam lobe profiles between the different valves may provide varying cam lift height, cam duration, and/or cam timing. However, alternative camshaft (overhead and/or pushrod) arrangements could be used, if desired. Further, in some examples, the plurality of cylinder 202 each may have more than one exhaust valve and/or intake valve. In still other examples, each of the exhaust valves and intake valves of one or more cylinders may be actuated by a common camshaft. Further still, in some examples, some of the intake valves and/or exhaust valves may be actuated by their own independent camshaft or other actuation device.

Electric VCT system 201 includes an electric VCT intake actuator 224 operatively coupled to intake camshaft 214 and an electric VCT exhaust actuator 226 operatively coupled to exhaust camshaft 216. A position of intake camshaft 214 may be adjusted with intake actuator 224 via controller 220. Likewise, a position of exhaust camshaft 216 may be adjusted with exhaust actuator 226 via controller 220. Electric VCT system 201 may be configured to advance or retard valve timing by advancing or retarding cam timing and may be controlled via signal lines by controller 220.

In some embodiments, electric VCT system 201 may be a twin independent variable camshaft timing system, for changing intake valve timing and exhaust valve timing independently of each other. For example, electric VCT system 201 may be configured to rotate intake camshaft 214 and/or exhaust camshaft 216 independently of the crankshaft to cause the valve timing to be advanced or retarded. In some embodiments, electric VCT system 201 may be a cam torque actuated device configured to rapidly vary the cam timing. In some embodiments, valve timing such as intake valve closing (IVC) and exhaust valve closing (EVC) may be varied by a continuously variable valve lift (CVVL) device.

The valve/cam control devices and systems described above may be electrically powered, although in some implementations at least one camshaft may be adjusted via an electric actuator and another camshaft may be adjusted via a hydraulic actuator. In one example, a position of the camshaft may be changed via cam phase adjustment of an electrical actuator (e.g., an electrically actuated cam phaser) with a fidelity that exceeds that of most hydraulically operated cam phasers. Signal lines can send control signals to and receive a cam timing and/or cam selection measurement from the electric VCT system 201.

Controller 220 may control a camshaft position for a given camshaft based on closed-loop feedback. In one example, the camshaft position feedback may be determined based on a crankshaft position signal and a camshaft PIP signal for that camshaft. For example, electric VCT system 201 may be configured to adjust a camshaft position based on camshaft position feedback and operating conditions to open a first valve for a first duration during a first operating mode. In one particular example, the first operating mode occurs at an engine load below a part engine load threshold. Further, the electric VCT system may be configured to open the first valve for a second duration, shorter than the first duration, during a second operating mode. In one particular example, the second operating mode occurs at an engine load above an engine load threshold and an engine speed below an engine speed threshold (e.g., during low to mid engine speeds).

Such closed loop control may not be possible until the engine speed meets a minimum speed threshold. Moreover, the update rate and resolution of the feedback signal at such low rotational speeds may be unreliable. For example, a 4-teeth PIP wheel provides updated cam position every 180 crank angle degrees, which is 150 ms@200 RPM. However, in some cases, the electric VCT system 201 is desired to move the camshaft to a target position within 500 ms. The lack of camshaft position feedback at low engine speeds may make camshaft position control particularly difficult during engine shutdown and engine startup. Furthermore, controller 220 may be configured to adjust a camshaft position to a target starting position with electric VCT system 201 for a first firing event of engine startup. In particular, a camshaft position may be adjusted from a home position to a state other than an end-stop position in order to reduce feed-gas (FG) emissions during a first firing event.

Note that since electric VCT system 201 is powered via electricity, electric VCT system 201 can adjust a camshaft position at low engine speeds (e.g., during engine shutdown) where a hydraulically actuated VCT system would not be incapable of such adjustment.

In one example, controller 220 is configured to adjust a camshaft position to a target starting position during engine shutdown based on camshaft position feedback in preparation for a next engine startup. This way, the camshaft can be accurately positioned at the target starting location based on camshaft position feedback when the engine starts. However, the inventors herein have recognized that since various mechanisms may not have locking pins to keep the camshaft in place when there is no power to the electric VCT actuator, the camshaft position may be moved towards retarded positions due to friction drag effects during the un-controlled phases and would not be maintained at the target starting position for the first engine firing event. In other words, the camshaft position may drift from the target starting position during periods where camshaft feedback is unavailable (e.g., at low engine speeds) for closed-loop control of the electric VCT actuator of the electric VCT system.

In one example, controller 220 includes a processor 228 and computer readable medium 230 having instructions that when executed by the processor: during engine shutdown, adjust camshaft position with an electric VCT actuator to a target starting position, apply a first current to the electric VCT actuator to maintain the target starting position, and during engine startup before camshaft position feedback becomes available, apply a second current to the electric VCT actuator to maintain the target starting position. By applying the currents to the electric VCT actuator when the camshaft position feedback is unavailable for closed-loop control, the VCT actuator may be adjusted to counteract valvetrain friction torque applied to the camshaft during such uncontrolled phases during engine shutdown and engine startup. In this way, the camshaft position may be prevented from drifting from a target starting position when camshaft position feedback is unavailable.

In some embodiments, the first and second currents are pre-set currents that can be pre-determined for a given engine configuration by measuring valvetrain torque at low engine speeds, and with knowledge of the start-up and shut-down engine speed profiles and VCT inertial loads. In other words, the first current may be set to a fixed current level irrespective of conditions and the second current may be set to a fixed current level irrespective of conditions.

In other embodiments, the first and/or second current may be varied from one shutdown and startup event to the next. For example, once camshaft position feedback becomes available during engine startup, if the camshaft position is further from target starting position than a threshold, then for the next engine shutdown, one or both of the holding current levels may be adjusted so that the camshaft position is maintained closer to the target starting position. In other words, the hold currents may be adaptively learned from one engine shutdown/startup event to the next event. In one example, one or both of the holding currents may be corrected as a function of coolant temperature during engine shutdown and engine startup. In another example, one or both of the holding currents may be corrected as a function of oil temperature during engine shutdown and engine startup. In particular, the adaptive learning of the hold currents may be a function of both engine shutdown engine startup temperatures, because the temperatures may be different depending on the duration between engine shutdown and the next engine startup.

In some embodiments, the first and second current can be determined experimentally by controlling the engine at preset low-speed conditions and minimum torque to prevent retard and maximum torque to prevent advance of the camshaft. In some embodiments, the first current is less than the second current because the inertial torque applied to the camshaft during startup may be greater than torque applied during engine shutdown.

In some embodiments, the first current may be applied in response to the camshaft position feedback becoming unavailable while the engine is spinning during engine shutdown. In some embodiments, the target starting position may be based on a camshaft position signal that is derived from a crankshaft position and a camshaft PIP signal.

Note that the second current can be first applied before, during, or immediately after the engine starts spinning for engine startup. Further in some embodiments, the second current can be sustained until feedback sensors become adequate for supporting closed loop control.

Furthermore, in some embodiments, computer readable medium 230 of controller 220 further includes instructions that when executed by processor 228: increase the current applied to the electric VCT actuator from the first current to a third current that is greater than the first current to compensate for transient inertial loads of the valvetrain during engine shutdown. In other words, the pre-set current may be increased by a secondary margin in order to compensate for transient inertial loads that occur at a point between a commanded engine stop and when the engine stops spinning. It will be appreciated that the current may be increased in any suitable manner without departing from the scope of the present disclosure. For example, the current may be stepped up from the first current to the second current. As another example, the current may be ramped up from the first current to the second current. Moreover, it will be appreciated that the current may be adjusted at any suitable time between commanded engine shutdown and engine stop without departing from the scope of the present disclosure.

Furthermore, in some embodiments, computer readable medium 230 of controller 220 further includes instructions that when executed by processor 228: in response to the camshaft position feedback becoming available after engine startup, confirm the position of the camshaft, and adjust the camshaft position with the electric VCT actuator to the target starting position if the camshaft is not at the target starting position. In other words, when the camshaft position feedback first becomes available during engine startup (e.g., engine speed becomes greater than a speed threshold), the accuracy of the camshaft position relative to the target starting position can be confirmed. In the event that the camshaft is not at the target starting position or within a predefined tolerance, the closed-loop VCT control can quickly adjust the camshaft position to the target starting position since the camshaft may be likely close to the target starting position. Thus, the time to achieve the target starting position after regaining feedback control may be substantially reduced, or in the ideal case reduced to zero, relative to approaches that do not apply pre-set currents to the VCT actuators during periods where camshaft position feedback is unavailable.

In some embodiments, computer readable medium 230 of controller 220 further includes instructions that when executed by processor 228: apply different current levels to the electric VCT actuator during different conditions of non-combusting engine operation including a shutdown and immediately subsequent cranking and run-up while camshaft location feedback is unavailable. For example, the different camshaft hold currents may include a first current level during spin down and a second, different, current level during cranking. In some implementations, the different current levels may be pre-set and fixed irrespective of operating conditions. In some implementations, the different current levels may be changed responsive to whether the engine is spinning down to rest or spinning up from rest. In some implementations, the different current levels may be changed responsive to operating conditions. For example, the current levels may be adaptively learned or adjusted from one engine shutdown/startup event to the next. The current levels may be adjusted, for example, based on temperatures during engine shutdown and startup or another suitable operating parameter.

As described above, FIG. 2 shows a non-limiting example of an internal combustion engine and associated intake and exhaust systems. It should be understood that in some embodiments, the engine may have more or less combustion cylinders, control valves, throttles, and compression devices, among others. Example engines may have cylinders arranged in a "V" configuration. Further, a first common camshaft may control the valves for a first set of cylinders on a first bank while a second camshaft may control the intake valves for a second set of cylinders on a second bank. That is, a common camshaft of a cam actuation system (e.g., an electric VCT system) may be used to control valve operation of a group of cylinders. Further, the electric VCT system may control a position of one or more camshafts of the engine.

The configurations illustrated above enable various methods for controlling an electric VCT system to maintain a camshaft at a desired target starting position for a first firing event after engine startup. Accordingly, some such methods are now described, by way of example, with continued reference to above configurations. It will be understood, however, that these methods, and others fully within the scope of the present disclosure, may be enabled via other configurations as well.

Figure 3A:
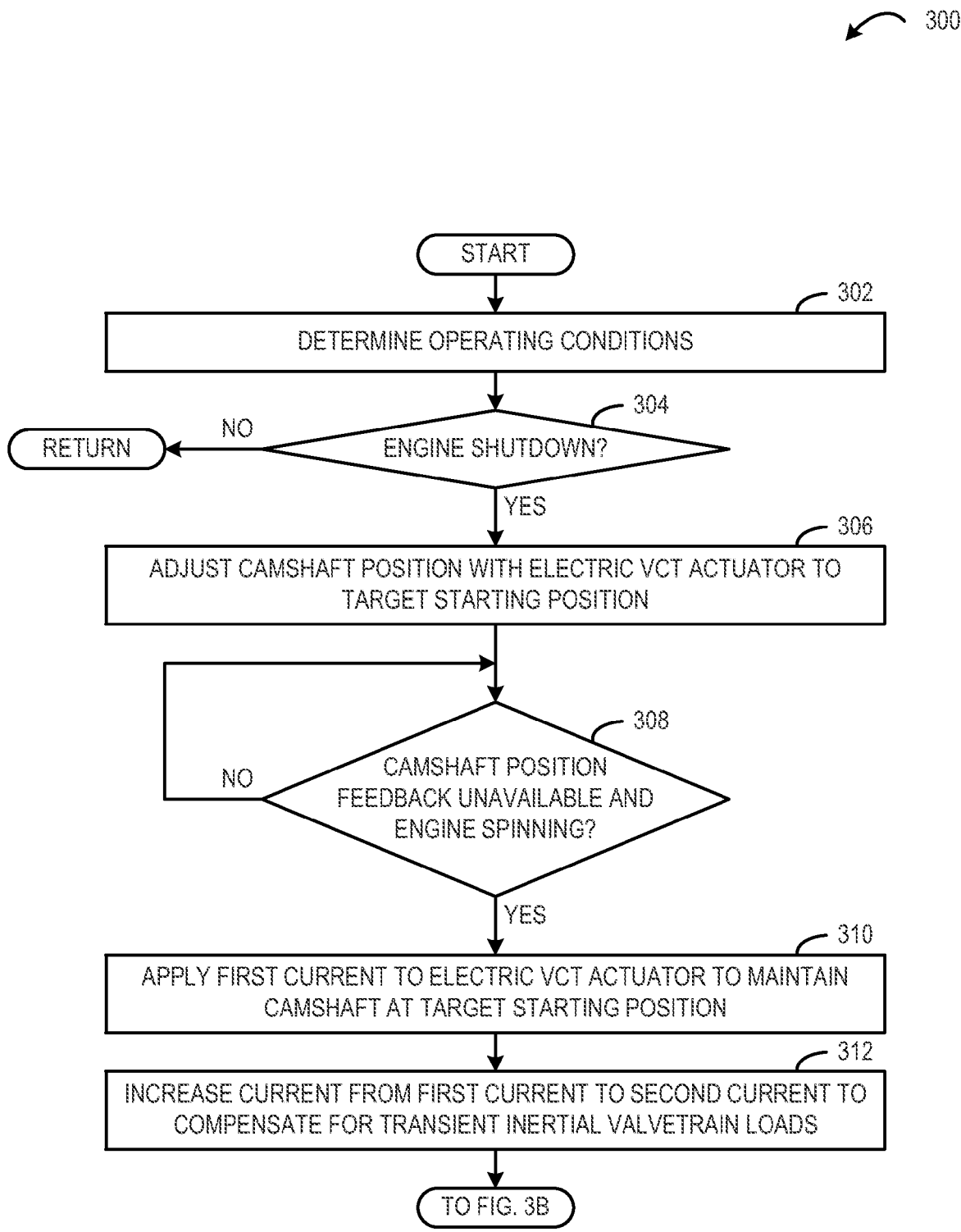
FIG. 3 shows an embodiment of a method for adjusting a camshaft position with a variable cam timing actuator.
Figure 3B:
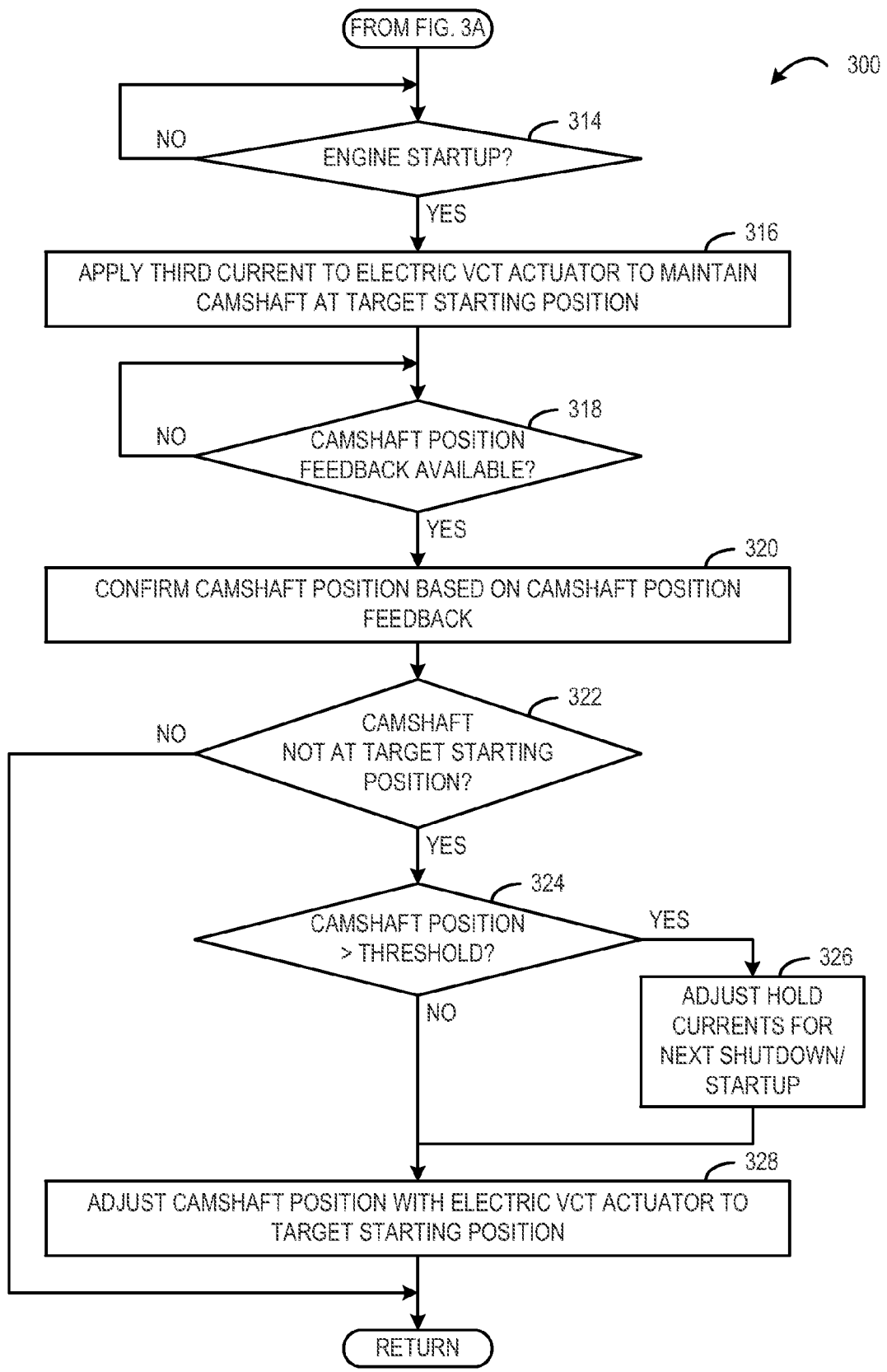

FIG. 3 shows an embodiment of a method 300 for controlling camshaft position with an electric VCT actuator of an electric VCT system. For example, the method may be performed by controller 12 in FIG. 1 or controller 220 of FIG. 2.

At 302, the method 300 includes determining operating conditions. Determining operating conditions may include, for example, camshaft position, crankshaft position, engine speed, torque demand, vehicle speed, ambient conditions, engine temperature, exhaust catalyst temperature, MAP, MAF, etc.

At 304, the method 300 includes determining whether engine shutdown is commanded. If engine shutdown is commanded, then the method 300 moves to 306. Otherwise, the method 300 returns to other operations.

At 306, the method 300 includes adjusting the camshaft to a target starting position with the electric VCT actuator. For example, the camshaft position may be adjusted in a closed-loop manner based on camshaft position feedback that includes a crankshaft position and a camshaft position. In one example, the target starting position is based on a camshaft position signal.

At 308, the method 300 includes determining whether the camshaft position feedback is unavailable and the engine is spinning. In one example, the determination may be made based on an engine speed becoming less than a speed threshold. If the camshaft position feedback is unavailable and the engine is spinning, then the method 300 moves to 310. Otherwise, the method 300 returns to 308.

At 310, the method 300 includes applying a first current to the electric VCT actuator to maintain the camshaft at the target starting position. In one example, the first current may be applied in response to the camshaft position feedback becoming unavailable while the engine is spinning during engine shutdown. In some embodiments, the first current may be applied until engine stop.

In some embodiments, at 312, the method 300 includes increasing the current applied to the electric VCT actuator from the first current to a third current that is greater than the first current to compensate for transient inertial loads of a valvetrain during engine shutdown. For example, the second current may be a pre-set currents that can be pre-determined for a given engine configuration by measuring valvetrain torque at low engine speeds, with knowledge a shut-down engine speed profiles and VCT system inertial loads. In some embodiments, the second current may be temporarily applied, and the current may be reduced to the first current. In some embodiments, the second current may be applied until engine stop.

At 314, the method 300 includes determining whether engine startup is commanded. If engine startup is commanded, then the method 300 moves to 316. Otherwise, the method 300 returns to 314.

At 316, the method 300 includes applying a second current to the electric VCT actuator to maintain the camshaft at the target starting position. In some embodiments, the second current may be applied before the engine starts spinning for engine startup. In some embodiments, the second current may be applied after the engine starts spinning for engine startup. In some embodiments, the first and second currents are the same. In some embodiments, the first current differs from the second current. In some embodiments, the first current is less than the second current.

At 318, the method 300 includes determining whether camshaft position feedback is available. In one example, the determination may be made based on an engine speed becoming greater than a speed threshold. If the camshaft position feedback is available, then the method 300 moves to 320. Otherwise, the method 300 returns to 318.

At 320, the method 300 includes confirming the position of the camshaft based on the camshaft position feedback.

At 322, the method 300 includes determining whether the camshaft is positioned at the target starting position. If the camshaft is not positioned at the target starting position, the method 300 moves to 324. Otherwise, the method 300 returns to other operations.

At 324, the method 300 includes determining whether the camshaft position is farther from the target starting position than a threshold. If the camshaft position is farther from the target starting position than the threshold, then the method 300 moves to 326. Otherwise, the method 300 moves to 328.

At 326, the method 300 includes adjusting one or both of the first and second hold currents for the next engine shutdown/startup event. The hold currents may be adjusted via adaptive learning to more accurately maintain the camshaft at the target starting position during the next engine shutdown/startup event. In one example, the hold current correction may be based on a function of coolant temperature (or oil temperature) during engine shutdown and engine startup. The function may track temperature during both engine startup and shutdown, because the temperatures may be different depending on the duration between engine shutdown and the next startup.

At 328, the method 300 includes adjusting the camshaft position with the electric VCT actuator to the target starting position. By applying pre-set current to the VCT actuator during conditions where camshaft position feedback is unavailable, the likelihood of the camshaft drifting from the target position may be reduced. Moreover, in the event that the position is not at the target position or within a designated tolerance, when closed-loop VCT control does become available, the camshaft can be quickly adjusted to the target position, since the camshaft is likely to be close to the target position. Thus, the time to position the camshaft at the target position after regaining feedback control may be substantially reduced, or in the ideal case reduced to zero, relative to approaches that do not apply current to the VCT actuators during conditions where camshaft position feedback is unavailable.

In another embodiment, a method comprises applying different current levels to an electric VCT actuator of an engine during different conditions of non-combusting engine operation including a shutdown and immediately subsequent cranking and run-up while camshaft location feedback is unavailable. In one example, the different current levels include a first current level during engine shutdown where the engine is spinning down to rest and a second, different, current level during engine startup where the engine is cranking up to the first firing event. In some embodiments, the different current levels may be changed responsive to whether the engine is spinning down to rest or spinning up from rest, due to different inertial torques applied to the camshaft during each event.

In another embodiment, a method for controlling a VCT actuator comprises during engine shutdown, adjusting a camshaft with the VCT actuator to a target starting location, applying a first holding level to the VCT actuator to maintain the target starting location, and during engine startup before camshaft position feedback becomes available, applying a second holding level to the VCT actuator to maintain the target starting location. In some implementations, the holding levels may be pre-set. In some implementations, the holding levels may be adjusted based on operating conditions. In one example, the VCT actuator is an electric VCT actuator and the first holding level is a first current and the second holding level is a second current. In another example, the VCT actuator is hydraulically-actuated and the first holding level is a first hydraulic pressure and the second holding level is a second holding pressure. It will be appreciated that the holding levels may be representative of any suitable VCT operating parameter without departing from the scope of the present disclosure.

Figure 4:
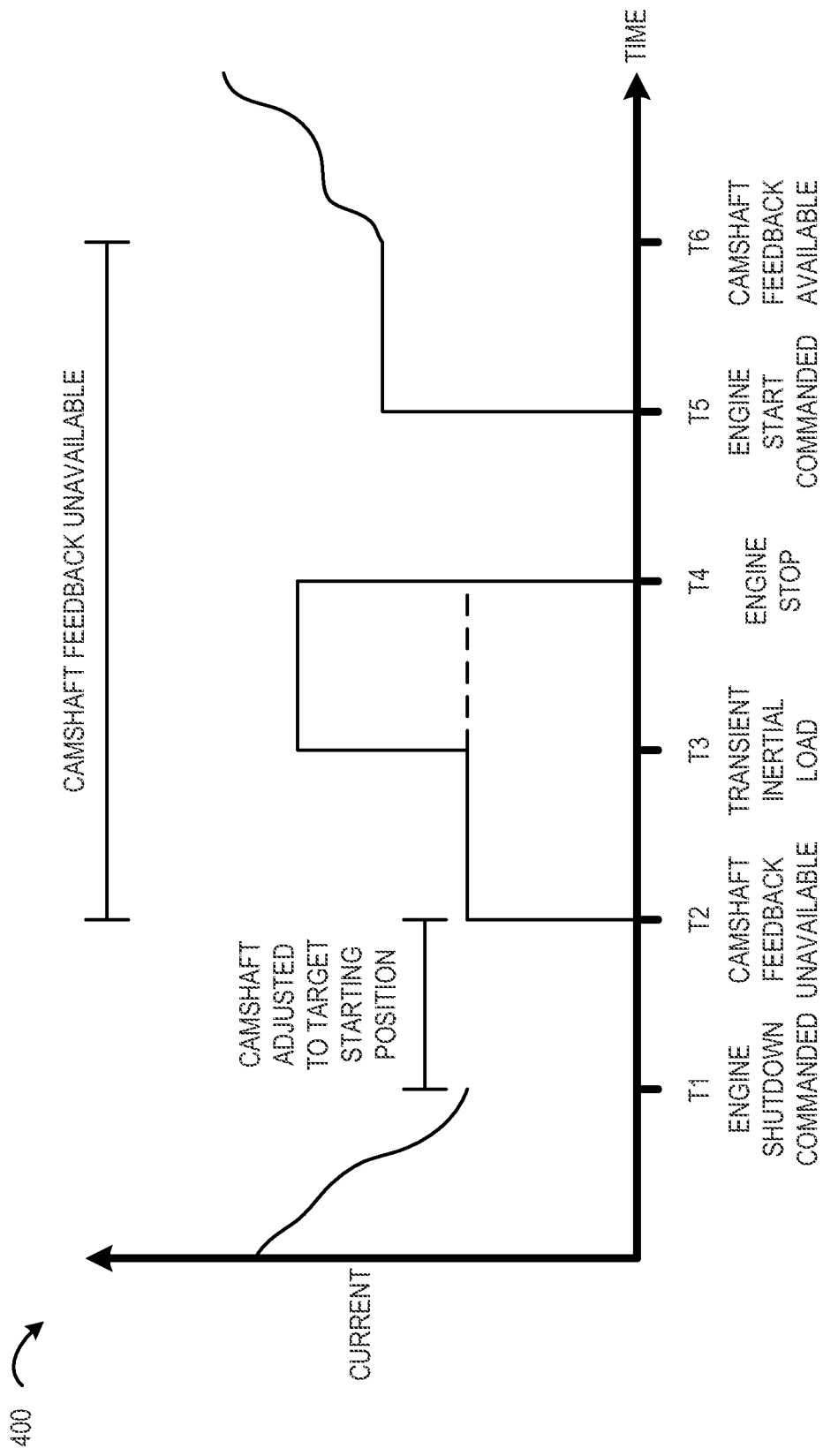
FIG. 4 shows a graph characterizing current applied to an electric VCT actuator during various operating conditions.

FIG. 4 shows a graph 400 characterizing current applied to an electric VCT actuator during various operating conditions. The graph 400 charts current applied to the VCT actuator to control camshaft position versus time. Note that when camshaft feedback is available closed-loop feedback control of the camshaft position may be employed. Further, it will be appreciated that the illustrated closed-loop feedback control is merely an example, and may differ without departing from the scope of the present disclosure.

At time T1, engine shutdown is commanded. At time T2, camshaft position feedback becomes unavailable due to the engine speed dropping as the engine spins down. At some point between T1 and T2, the camshaft position is adjusted to the target starting position with the electric VCT actuator. In response to the camshaft position feedback becoming unavailable, a first current is applied to the electric VCT actuator to compensate for valvetrain torque and maintain the target starting position. In some embodiments, the first current is applied until engine stop at time T4. In some embodiments, at time T3, the current is increased from the first current to the second current to compensate for transient inertial loads. In some embodiments, the second current is applied until engine shutdown at time T4. At time T5, engine startup is commanded, and a third current is applied to the VCT actuator to maintain the target starting position. In the illustrated example, the third current is greater than the first current, although it will be appreciated that in some embodiments, the third current may be the same or less than the first current or the second current. In some embodiments, the third current is applied until the camshaft position feedback becomes available at time T6. Once camshaft position feedback becomes available again at time T6 closed-loop feedback control of the camshaft resumes. Note that the camshaft position feedback is unavailable for the duration between time T2 and time T6.

Note that the illustrated first, second and third hold currents are merely examples and may differ without departing from the scope of the present disclosure. Moreover, the hold currents may differ from one engine shutdown/startup event to the next. Furthermore, in some implementations one or more of the currents may not be constant as shown. For example, the third current may be varied to compensate for inertial torque during engine cranking.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling a variable cam timing (VCT) actuator comprising:
   during engine shutdown but before an engine stops: adjusting a camshaft with the VCT actuator to a target starting location, and then applying a first lower holding level and then a second higher holding level to the VCT actuator to maintain the target starting location;
   reducing current from the second holding level at engine stop; and
   during engine startup before camshaft position feedback becomes available, applying a third holding level, higher than the first level, to the VCT actuator to maintain the target starting location.

2. The method of claim 1, wherein the VCT actuator is an electric VCT actuator and the first holding level is a first current and the second holding level is a second current and third holding level is a third current.

3. The method of claim 2, further comprising:
   increasing current applied to the electric VCT actuator from the first current to the second higher current to compensate for transient inertial loads of a valvetrain during engine shutdown.

4. The method of claim 2, further comprising:
   in response to the camshaft position feedback becoming available after engine startup, confirming a camshaft position; and
   adjusting the camshaft position with the electric VCT actuator to the target starting location if the camshaft is not at the target starting location.

5. The method of claim 4, further comprising:
   in response to the camshaft position being greater than a threshold from the target starting location, adjusting one or both of the first current and the third current applied to the electric VCT actuator to maintain the camshaft at a target starting location for a next engine startup.

6. The method of claim 2, wherein the first current is applied in response to the camshaft position feedback becoming unavailable while the engine is spinning during engine shutdown.

7. The method of claim 2, wherein the first current is set to a fixed current level irrespective of conditions and the third current is set to a fixed current level irrespective of conditions.

8. A system comprising:
   an engine including at least one cylinder;
   a camshaft coupled to the at least one cylinder, the camshaft actuatable to operate an intake and/or exhaust valve of the at least one cylinder;
   an electric VCT actuator operatively coupled to the camshaft, the electric VCT actuator operable to position the camshaft; and
   a controller including a processor and a computer readable medium having instructions that when executed by the processor:
      during engine shutdown, adjust camshaft position with the electric VCT actuator to a target starting position;
      during the shutdown but before the engine is stopped and while camshaft position feedback is unavailable, apply a first, lower current to the electric VCT actuator to maintain the target starting position and then applying a second, higher current to the electric VCT actuator;
      reduce applied current during engine stopped conditions; and
      during engine startup before camshaft position feedback becomes available, increase current from the stopped engine conditions current to apply a third current to the electric VCT actuator to maintain the target starting position.

9. The system of claim 8, wherein
the application of the second current to the electric VCT actuator compensates for transient inertial loads of a valvetrain during the shutdown.

10. The system of claim 8, wherein the computer readable medium further includes instructions that when executed by the processor:
   in response to the camshaft position feedback becoming available after engine startup, confirm the position of the camshaft; and
   adjust the camshaft position with the electric VCT actuator to the target starting position if the camshaft is not at the target starting position.

11. The system of claim 10, wherein the computer readable medium further includes instructions that when executed by the processor:
   in response to the camshaft position being greater than a threshold from the target starting location, adjusting one or both of the first current and the third current applied to the electric VCT actuator to maintain the camshaft at a target starting position for a next engine startup.

12. The system of claim 8, wherein the first current is set to a fixed current level irrespective of conditions and the third current is set to a fixed current level irrespective of conditions.

13. A method comprising:
   during engine shutdown but before an engine stops, adjusting camshaft position with an electric VCT actuator to a target starting position;
   in response to the camshaft position becoming unavailable while the engine is spinning during engine shutdown but before the engine stops, applying a first current to the electric VCT actuator to maintain the target starting position, and increasing current applied to the electric VCT actuator from the first current to a second current that is greater than the first current to compensate for transient inertial loads of a valvetrain during engine shutdown but before the engine stops;
   reducing applied current during engine stopped conditions; and
   during engine startup before camshaft position feedback becomes available, increasing current by applying a third current to the electric VCT actuator to maintain the target starting position.

14. The method of claim 13, further comprising:
   in response to the camshaft position feedback becoming available after engine startup, confirming the camshaft position; and
   adjusting the camshaft position with the electric VCT actuator to the target starting position if a camshaft is not at the target starting position.

15. The method of claim 14, further comprising:
   in response to the camshaft position being greater than a threshold from the target starting location, adjusting one or both of the first current and the third current applied to the electric VCT actuator to maintain the camshaft at a target starting position for a next engine startup.

16. The method of claim 13, wherein the first current is less than the third current and wherein the third current is applied to the electric VCT actuator until an engine speed is greater than a speed threshold.

17. A method, comprising:
   applying a first lower current and then a second, higher current level to an electric VCT actuator of an engine during non-combusting engine operation including a shutdown but before the engine is stopped and while camshaft location feedback is unavailable, and then reducing the applied current; and then
   increasing the current to a third level during immediately subsequent cranking and run-up while camshaft location feedback is still unavailable.

\* \* \* \* \*